(12) United States Patent
Aiello et al.

(10) Patent No.: US 11,947,705 B2
(45) Date of Patent: *Apr. 2, 2024

(54) DEVICE AND METHOD FOR ANALYZING THE PERFORMANCES OF AN N-TIER APPLICATION

(71) Applicant: BULL SAS, Les Clayes-sous-Bois (FR)

(72) Inventors: Damien Aiello, La Buisse (FR); Wajih Chaabane, Chambery (FR); Bruno Demeilliez, Saint Laurent du Pont (FR)

(73) Assignee: BULL SAS, Les Clayes-sous-Bois (FR)

( * ) Notice: Subject to any disclaimer, the term of this patent is extended or adjusted under 35 U.S.C. 154(b) by 426 days.

This patent is subject to a terminal disclaimer.

(21) Appl. No.: 16/928,108

(22) Filed: Jul. 14, 2020

(65) Prior Publication Data
US 2021/0026989 A1    Jan. 28, 2021

(30) Foreign Application Priority Data

Jul. 15, 2019 (FR) ...................................... 1907979

(51) Int. Cl.
*G06F 21/62* (2013.01)
*G06F 11/34* (2006.01)
*G06F 11/36* (2006.01)

(52) U.S. Cl.
CPC ...... *G06F 21/6254* (2013.01); *G06F 11/3409* (2013.01); *G06F 11/3457* (2013.01); *G06F 11/3684* (2013.01)

(58) Field of Classification Search
CPC ............. G06F 11/3409; G06F 11/3457; G06F 11/3684; G06F 21/6254
See application file for complete search history.

(56) References Cited

U.S. PATENT DOCUMENTS 6,775,824 B1 * 8/2004 Osborne, II ........ G06F 11/3664
717/125
7,970,946 B1    6/2011 Djabarov et al.
(Continued)

FOREIGN PATENT DOCUMENTS

WO     2014/116291 A1    7/2014

OTHER PUBLICATIONS

Chien-An Lai et al., "milliScope: A Fine-Grained Monitoring Framework for Performance Debugging of n-Tier Web Services," 2017 [retrieved on Jun. 30, 2023], IEEE 37th International Conference on Distributed Computing Systems (ICDCS), downloaded from <url>: https://ieeexplore.ieee.org. (Year: 2017).*
(Continued)

*Primary Examiner* — S. Sough
*Assistant Examiner* — Stephen D Berman
(74) *Attorney, Agent, or Firm* — ARC IP Law, PC; Joseph J. Mayo (57) ABSTRACT

A device and method for analyzing a performance of an n-tier application capable of carrying out on-the-fly anonymization processing of production data. The production data is generated following a performance test request message transmitted to the n-tier application. The anonymization processing is implemented by an anonymization module that identifies, from a sensitive data identification repository, data to be anonymized in the response message. The anonymization processing also includes generating, from an anonymization repository, anonymized data from the previously identified data to be anonymized, and generating an anonymized response message from the anonymized data and the response message.

12 Claims, 3 Drawing Sheets

(56) References Cited

U.S. PATENT DOCUMENTS

| | | | |
|---|---|---|---|
| 8,751,450 B1 * | 6/2014 | Gaonkar | G06F 21/00 |
| | | | 707/634 |
| 9,207,969 B2 | 12/2015 | Krajec | |
| 10,289,533 B2 * | 5/2019 | Kunz | G06F 11/3692 |
| 10,664,381 B2 * | 5/2020 | Walters | G06N 5/01 |
| 10,956,187 B2 * | 3/2021 | Petkov | G06F 21/6254 |
| 2003/0163608 A1 | 8/2003 | Tiwary et al. | |
| 2014/0019985 A1 | 1/2014 | Krajec | |
| 2018/0373885 A1 | 12/2018 | Arad et al. | |

OTHER PUBLICATIONS

Search Report issued in FR1907979 dated Jul. 15, 2019 (5 pages).

* cited by examiner

DEVICE AND METHOD FOR ANALYZING THE PERFORMANCES OF AN N-TIER APPLICATION

This invention relates to the field of computer infrastructure test performance. More particularly, the invention relates to a method and a system for analyzing the performance of an n-tier application allowing the management of confidential and/or sensitive data.

PRIOR ART

Performance tests ("Benchmark" can aim to solve existing performance problems of an application, to size an infrastructure necessary for an application according to a given use, to validate the performance, the endurance, the robustness of an n-tier application, to compare evolutions (application version, optimizations, etc.), among others.

Such IT infrastructures are, for example, high-performance computers, generally referred to as HPC "clusters" (HPC being the acronym for "High Performance Computing"). They can also be server networks (e.g., n-tier).

Performance testing applications (or software) make it possible to simulate several simultaneous users. For example, for an n-tier application computing infrastructure (a network of n-tier servers), the test application is capable of sending a very large number of requests to the infrastructure (for example in SQL ("Structured Query Language") format) as if they originated from different simultaneous users.

These applications make it possible to create one or more test scenarios by choosing one or more request categories to be executed by the tested application and by choosing a request flow for each scenario. The test applications perform a number of measurements (infrastructure response time, error rate, among others) and generate a test report.

Typically, an IT infrastructure performance test can be performed in several steps (U.S. Pat. No. 7,970,946). In a first step, the test strategy is defined, including the definition of the technical context of the architecture being tested, the choice of one or more scenarios and the weighting of these scenarios (e.g., the definition of the relative importance of each one in relation to the other ones), the determination of the target volume (e.g., the desired request throughput for the test), the determination of the types of requests to be sent according to the objectives of the test, and the definition of the architecture being tested.

Following, the test environment is set up. This involves, for example, applying a certain configuration to the IT architecture being tested in order to be able to test that particular configuration.

The test scenarios are then defined using testing applications (e.g. JMeter®) and modified in order to be configurable. Then, from these definitions, instruction injection sets are built. This involves defining the parameters for the requests to be sent to the tested infrastructure to implement the scenarios. Scheduling scripts are then generated to execute in chronological order the tasks required to implement the requests according to the injection sets. Finally, the requests are executed during a "shooting campaign" and the results are measured and analyzed to generate a report.

Thus, to carry out these performance tests, it is necessary to have a sufficient data set to test the application. To do this, a first solution is to use the production data from the application to perform such performance tests. However, the use of such production data may not be possible, especially when it contains sensitive and/or confidential information that cannot be communicated to third parties. It is then customary to create a test dataset in order to be able to carry out performance tests while respecting the data confidentiality rules imposed by European regulatory standards.

Nevertheless, creating a test dataset can be very complex and time-consuming due to the volume of data required to perform such tests, but also due to the complexity of modifying the original data to comply with confidentiality standards. Solutions have been developed (US2018/373885 or WO2014/116291) to ensure data confidentiality. Therefore, these solutions implement an obscuration of confidential data using obscured identifiers to create obscured representations of the data. However, these solutions do not guarantee the confidentiality of the production data but of the results data. Moreover, these solutions generate relatively long response times and are, therefore, conducive to the phenomenon of overhead (or excess time).

Currently, known solutions do not allow testing the application from production data; therefore, there is a need for new solutions making it possible to use production data to perform performance tests while guaranteeing the confidentiality and consistency of this data.

Technical Problem

The object of the invention is therefore to overcome the shortcomings of the prior art. In particular, the invention aims to propose a method for analyzing the performance of an n-tier application comprising on-the-fly anonymization processing of production data, said method making it possible to ensure the confidentiality of the sensitive data of said production data while using all the production data to carry out the performance tests.

The invention further aims to provide a device for analyzing the performance of an n-tier application, said device allowing performance tests to be carried out on the basis of production data, within the framework of n-tier applications, while ensuring the anonymization of the sensitive data of said production data.

BRIEF DESCRIPTION OF THE INVENTION

For this purpose, the invention relates to a method for analyzing the performance of an n-tier application comprising on-the-fly anonymization processing of production data, in particular intended for an electronic communicating device to carry out the performance test, said production data being generated following a performance test request message transmitted, preferably from a business server, to a persistence server, said anonymization processing being implemented by an anonymization module comprising a processing unit, a communication means, and a data memory configured to store a sensitive data identification repository and an anonymization repository, said on-the-fly anonymization processing of production data of the n-tier application comprising:

a step of receiving, by a communication means, a response message to the performance test request message, following the transmission of said response message by a persistence server;

a step of identifying, by the processing unit from the sensitive data identification repository, data to be anonymized in the response message;

a step of encoding, by the processing unit from the anonymization repository, comprising the generation of anonymized data from the previously identified data to be anonymized;

a step of generating, by the processing unit from the anonymized data and the response message, an anonymized response message; and a step of sending, by the communication medium, the anonymized response message to the business server, said anonymized response message comprising data necessary for analyzing the performance of the n-tier application.

Such a method makes it possible to anonymize on-the-fly production data of an n-tier application as they are transmitted by the n-tier application. Thus, a user can avoid the tedious step of transforming a dataset before setting up a performance test. Moreover, the administrator of the n-tier application knows that this data will be anonymized according to predetermined procedures. Thus, such a process saves time but also allows for analyses that are as close as possible to real-life conditions. In addition, performance analyses can be performed at the level of the anonymization module, a client workstation or any other remote device. This method makes it possible to keep the entire initial dataset, said initial data being partly confidential, to optimize anonymization by encrypting part of the initial data and to keep the coherence of the initial data so as to be able to carry out the desired tests. In particular, this method makes it possible to produce a dataset for performance analysis purposes in which only part of said data is anonymized, only the data described by the anonymization repository is encoded and thus the rest of the data remains "readable". Such a continuously produced dataset can therefore be used for performance testing while maintaining data confidentiality.

This selective anonymization of a dataset therefore allows to provide a complete dataset for performance testing on n-tier applications in complete security/confidentiality.

According to other characteristics of the method, the latter may optionally include one or more of the following characteristics, either individually or combined:

it further comprises a step of recording, on a correspondence repository between sensitive data and anonymized data, a correspondence between each of the data to be anonymized and each of the corresponding anonymized data. The presence of such a repository and this recording of correspondence allows to de-anonymize the data more quickly. Alternatively, a de-anonymization algorithm, as opposed to the algorithm used to anonymize the data, may be used. Sensitive data are data that should be anonymized.

It further comprises a step of measuring a plurality of operating parameters of the n-tier application, preferably at least partly from a plurality of anonymized response messages. In addition, this step may include a measurement of resource consumption on the second device by probes. In this way, it will be possible to monitor the service levels, or, more broadly, the performance of the n-tier application, over time.

it further comprises a step of generating at least one performance indicator value of the n-tier application. This generation step can be performed by the anonymization module, by a client workstation or by another device such as the persistence server if it is configured accordingly. Therefore, a user will have clear information on the performance of the n-tier application.

it further comprises a step of generating at least one load plan comprising at least one scenario of a performance test capable of allowing a plurality of request messages to be generated. This automated generation, for example from previous data, allows significant time savings in the context of performance analysis.

The load plan is previously recorded on a data memory of a communicating electronic device that carries out the performance test of the n-tier application. Therefore, the calculation of a load plan is performed from a device separate from the electronic device(s) having the n-tier application.

It further comprises a step of injecting an application load relating to the performance test scenario, said step of injecting the application load being implemented by an injection module of the communicating electronic device carrying out the performance test. Therefore the load is controlled from a device separate from the electronic device(s) having the n-tier application.

the application load makes it possible to simulate an activity of the n-tier application through requests to the n-tier application and these requests are intercepted by the anonymization module. Therefore the anonymization module is independent from the communicating electronic device performing the performance test.

It comprises a step of comparing data of a request message with the correspondence repository, and, when said request message does not comprise any anonymized data, transmitting, by the communication means, the request message to the persistence server. Such a feature allows a real interaction with the n-tier application during the performance analysis and this without any disclosure of sensitive information.

It comprises a step of identifying an anonymized data element in the request message then a step of restoring an anonymized data element, said restoration step comprising, for example from the correspondence repository, the substitution in the request message of an anonymized data element by a corresponding data element to be anonymized so as to generate a restored request message. Such a feature allows a real interaction with the n-tier application during the performance analysis and this without any disclosure of sensitive information.

The encoding step corresponds to an anonymization and/or pseudonymization of all or part of the data to be anonymized. In particular, pseudonymization allows a performance analysis to be carried out according to business rules, which would not be possible if the information were fully encrypted.

Other implementations of this aspect include computer systems, devices and corresponding computer programs stored on one or more computer storage devices, each being configured to perform the actions of a process according to the invention. In particular, a system of one or more computers may be configured to perform particular operations or actions, in particular a process according to the invention, through the installation of software, firmware, hardware or a combination of software, firmware or hardware installed on the system. In addition, one or more computer programs may be configured to perform particular operations or actions by means of instructions which, when executed by a data processing device, cause the device to perform the actions.

Thus, the invention further relates to a computer program product comprising one or more instructions executable by a processing unit of an anonymization module, the execution of said instructions, for example by said anonymization module, causing the implementation of a method for analyzing the performance of an n-tier application according to the invention.

The invention also relates to an anonymization module configured to perform on-the-fly anonymization processing of production data generated by an n-tier application, said production data being generated following a performance test request message transmitted, preferably from a communicating electronic device carrying out the performance test, to said n-tier application, said anonymization module comprising:

a communication means configured to receive a response message to the performance test request message, following transmission of said response message by a persistence server,     a data memory configured to store a sensitive data identification repository and an anonymization repository,     a processing unit configured to analyze said performance test request message and/or response message and to implement on-the-fly anonymization processing of the production data, said processing unit being configured in particular for:

Identifying, from the sensitive data identification repository, data to be anonymized in the response message;

Generating, from the anonymization repository, anonymized data from the previously identified data to be anonymized; and         Generating an anonymized response message from the anonymized data and the response message.

said communication means also being configured to send the anonymized response message to a business server, said anonymized response message comprising data necessary for analyzing the performance of the n-tier application.

The invention also relates to a system for analyzing the performance of an n-tier application comprising:

a persistence server configured to store data for the execution of the n-tier application and to receive a performance test request message and to transmit a request response message;

an anonymization module according to the invention.

In particular, a system according to the invention may comprise a communicating electronic device performing the performance test configured to transmit the performance test request message and to receive the preferably anonymized response message. In this context, the anonymization module according to the invention is then advantageously configured to intercept the performance test request message and the response message and to anonymize the response message.

Other benefits and features of the invention will become apparent upon reading the following description, given by way of illustrative and non-limiting example, with reference to the accompanying drawings:

Some aspects of the present invention are disclosed with reference to flow charts and/or to functional diagrams of methods, apparatuses (systems) and computer program products according to embodiments of the invention.

In the drawings, the flow charts and functional diagrams illustrate the architecture, the functionality and the operation of possible implementations of systems, methods and computer program products according to various embodiments of the present invention. In this respect, each block in the flow diagrams or block diagrams may represent a system, device, module or code, which comprises one or more executable instructions to implement the specified logical function(s). In some implementations, the functions associated with the blocks may appear in a different order than that shown in the figures. For example, two blocks shown in succession may, in fact, be executed substantially simultaneously, or the blocks may sometimes be executed in the reverse order, depending on the functionality involved. Each block in the block diagrams and/or flow diagrams, and combinations of blocks in the block diagrams and/or flow diagrams, may be implemented by special hardware systems that perform the specified functions or execute or perform combinations of special hardware and computer instructions.

DESCRIPTION OF THE INVENTION

In the remainder of the description, "communicating electronic device" means any computing device or computing infrastructure comprising one or more hardware and/or software resources configured to send and/or receive request messages and to store information relating to said request messages capable of running an application or an application chain. The computing structure may be one server or several servers, and may for example be made up of a presentation server, a business server and a data server. The communicating electronic device can also be a "test" server with the same resources as a production server or a clone of a virtual production server. Preferably, a computing structure is a server.

The expression "on-the-fly anonymization of production data" in the sense of the invention, corresponds to a dynamic anonymization of production data, in particular following a response message to a request issued by a communicating electronic device, such as a persistence server, to a third party communicating electronic device, comprising for example a module for accessing a database.

A "performance test request message" means the act of sending, by a performance test application, to a communicating electronic device such as a persistence server hosting an n-tier application, a message in SQL format.

An "n-tier application" means an application hosted by an application server of an n-tier architecture. An n-tier architecture consists of segmenting an application into several layers. Generally, there is at least one layer responsible for communication with a database that can be represented by an SQL database, XML files, etc. This makes it possible to communicate directly with this communication layer rather than directly with a database. There is also a business layer, which forms the core of the application and covers all the processes that will make it possible to handle and transform business data defined by a client request (through request messages). Finally, there is a presentation layer, comprising everything relating to data display and interaction with the application. Under no circumstances can the business layer or the presentation layer communicate directly with the database, thus ensuring that a modification made on one layer does not impose any change on the others.

For the purposes of the invention, "probe" or "computer probe" means software associated with equipment which makes it possible to carry out, manage and transmit to computer equipment measurements intended to provide information on, among other things, values of quality of service parameters, the operating state of resources or the use of resources.

For the purposes of the invention, a "predetermined load plan" is a configuration file of the load or constraint to be applied to a computing device or computing infrastructure. The configuration file may, for example, be a file, or a set of files, allowing the association of several data or fields. This association of fields is also called a load record. Such a load configuration file is, for example, an XML file, a CSV file, an INI file, a JSON file, etc. A load configuration file can contain one or more load records. It can be generated from information entered by a user.

"Resources" means hardware resources such as parameters, capabilities or functions of computing devices that make it possible to run an n-tier application. The same computing device is generally associated with several resources. For example, the term "resource" may include physical or virtual resources such as network disks characterized, for example, by their input/output (I/O), read/write to disks, memory usage rate, a network characterized by its bandwidth, a processor characterized for example by its usage (in percentage) or the occupancy rate of its caches, a random access memory characterized, for example, by the amount allocated, or more globally, the latency time of a process or packet losses.

For the purposes of the invention, "level of a resource" or "resource levels", mean an amount of resource. For example, this may correspond, for network disks, to the number of available network disks or to the amount of memory available on these network disks, for a processor, to the number of cores or to the number of processors or to the size of caches, for random access memory, to the amount available, and for ports, to the number of ports that can be opened simultaneously.

For the purposes of the invention, "level of resource use" means a value representative of the consumption or occupation of said resource during the operation of an application chain. For example, the use value may correspond for network disks to their inputs/outputs, read/write to disks, memory usage rate, for a network to its bandwidth, for processors to their use (in percent) or to the cache occupancy rate, for random access memory to the amount used and for ports, the number of ports having been opened simultaneously during the operation of the method. The usage value is advantageously reduced to the percentage of the resource level.

For the purposes of the invention, the expression "level of service" corresponds to a quality of service to which a third party can commit and thus guarantee good performance for an organization's critical applications. Therefore, the level of service may correspond to objective criteria such as throughputs and response times associated with an n-tier application or subjective criteria, and take the form, for example, of a scale of values, either numerical or not, corresponding to an assessment of the quality of the level of service. The level of service may correspond to one or more values.

For the purposes of the invention, the term "data transformation" refers to any technique aimed at anonymizing a dataset. A data transformation may therefore correspond to a data encryption technique, the function of which is to render such a dataset unreadable or at least intelligible, or to a technique for encoding a dataset, the function of which is to replace a data element with third-party data element while maintaining the readability and intelligibility of the dataset. For example, the encoding of data may correspond to a pseudonymization technique.

"Performance indicator" means providing a user, in particular via a suitable man-machine interface, with a graphical rendering after the performance test has been carried out. Such a performance indicator may be in the form of one or more values reflecting the level of use of one or more resources, or a graph showing the evolution of the level of use of one or more resources over time and during the test phase.

For the purposes of the invention, the term "injection" may correspond to the sending of request messages to an n-tier application, said request messages being intercepted by a communicating electronic device configured to analyze and anonymize the data contained in said messages.

For the purposes of the invention, "process", "calculate", "determine", "display", "extract", "compare" or more broadly, an "executable operation" mean an action performed by a device or a processor unless otherwise indicated by the context. In this respect, operations relate to actions and/or processes in a data processing system, for example a computer system or electronic computing device, which handles and transforms data represented as physical (electronic) quantities in the memories of the computer system or other devices for storing, transmitting or displaying information. These operations can be based on applications or software programs.

The terms or expressions "application", "software", "program code" and "executable code" mean any expression, code or notation in a set of instructions intended to cause data processing to carry out a particular function directly or indirectly (e.g., after a conversion operation to another code). Examples of program code can include, but are not limited to, a sub-program, a function, an executable application, a source code, an object code, a library and/or any other sequence of instructions designed for execution on a computer system.

For the purposes of the invention, "processor" means at least one physical circuit configured to execute operations according to instructions contained in a code. The physical circuit can be an integrated circuit. Examples of a processor include, but are not limited to, a central processing unit, a graphics processor, an application-specific integrated circuit (ASIC) and a programmable logic circuit.

For the purposes of the invention, the expression "man-machine interface" corresponds to any element that allows a human being to communicate with a computer; in particular, and without this list being exhaustive, a keyboard, and means making it possible, in response to the orders entered on the keyboard, to effect displays and optionally to select elements displayed on the screen using the mouse or a touchpad. Another exemplary embodiment is a touchscreen that makes it possible to select, directly on the screen, the elements touched by the finger or an object, and optionally with the possibility of displaying a virtual keyboard.

In the remainder of the description, the same references are used to designate the same elements.

In general, performance testing processes are generally required in the context of creating an n-tier application but also throughout the operation thereof. In particular, these processes make it possible, for an n-tier application and the computing device supporting it, to detect performance limits and weaknesses, and, as a result, make it possible to determine the corrections to be made, as well as to quantify the improvements made by these optional corrections.

In this regard, there are various performance testing tools (or software) that make it possible to simulate various scenarios of use of a target computing device in order to detect defects thereof. These tools include, for example, the WebLOAD® tool (offered by RADVIEW®), the Load Runner® tool (offered by HP®), the Rational Performance Tester® tool (offered by IBM®), the SOAtest® & Load-Test® tool (offered by PARASOFT®), the TOSCA-Testsuite® tool, or the JMeter® tool (an open source software published by the Apache® Foundation).

These tools are generally part of a performance test kit and make it possible to stress an information system by injecting one or several loads. Such a load can correspond to the simultaneous sending of requests according to pre-defined scenarios and to different instances of these scenarios. In particular, these different types of scenarios can include the simulation of bugs by reproducing anomalies, this type of test generally requires a very large volume of production data. In most cases, these performance tests are carried out on datasets that have been previously anonymized.

However, the prior anonymization of a dataset is on the one hand highly time-consuming and on the other hand limits the possibilities of performance testing. Thus, the inventors have developed a method and a performance device comprising on-the-fly anonymization of data, in particular of production data.

Figure 1:
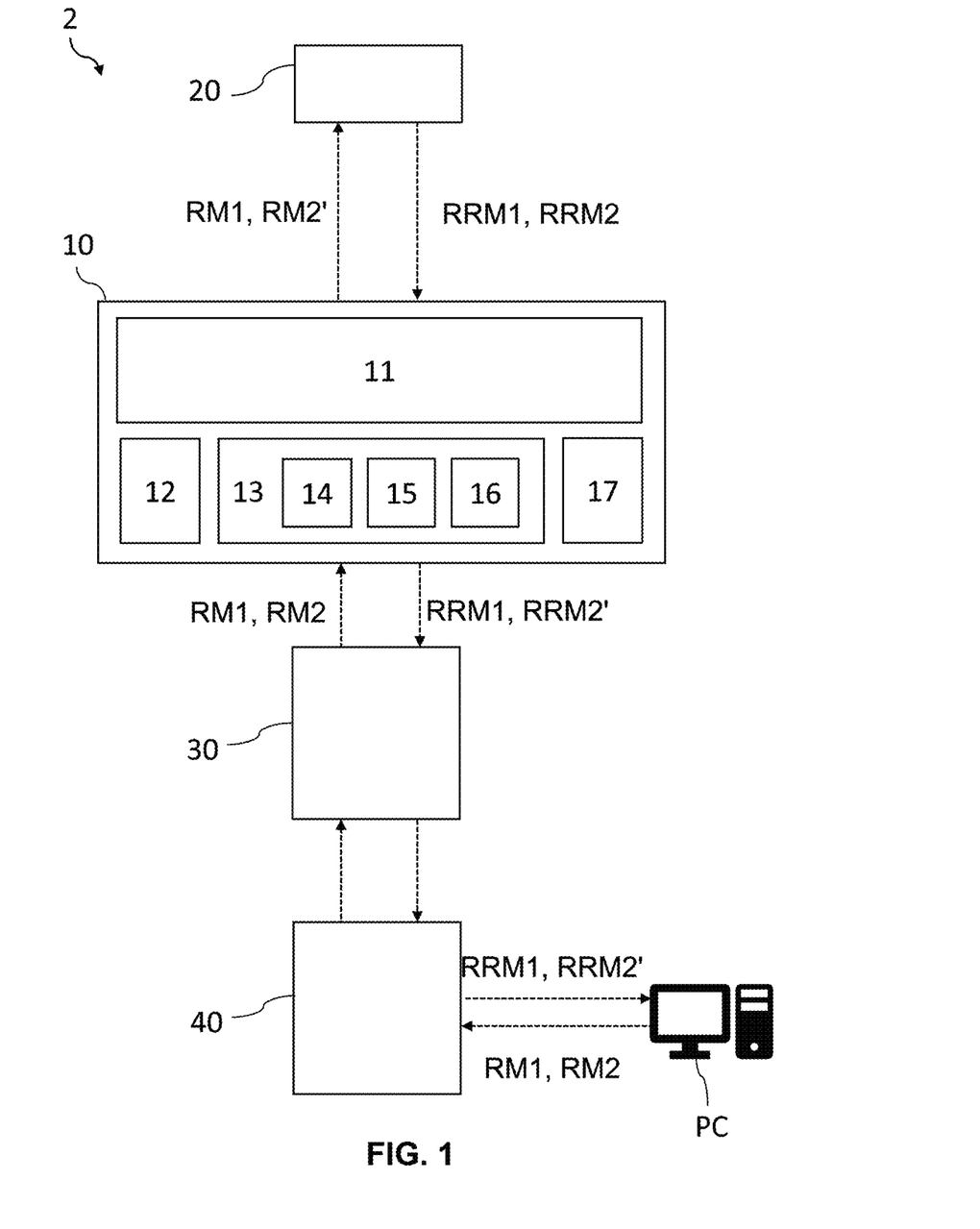
FIG. 1 shows a block diagram of a system for analyzing the performance of an n-tier application.

Thus, according to a first aspect, the invention relates to an anonymization module 10 configured to execute on-the-fly anonymization processing of production data. This anonymized production data is particularly useful for analyzing the performance of an n-tier application. In particular, and as shown in FIG. 1, an anonymization module 10 according to the invention may comprise a processing unit 11, a communication means 12, a data memory 13 and a database access module 17.

The processing unit 11 may comprise a processor for the execution of at least one request message analysis and processing function. In addition, the processing unit 11 may comprise or be coupled to other means such as combinations of processors, memory and codes supporting instructions or to a data memory comprising a plurality of stored repositories. The processing unit 11 may in particular be configured to analyze said performance test request messages RM1, RM2 and/or response messages RRM1, RRM2. Furthermore, it can implement on-the-fly anonymization processing of production data. The processing unit 11 being particularly configured to identify, from the sensitive data identification repository 14, data to be anonymized in the response message RRM1, RRM2; to generate, from the anonymization repository 15, anonymized data from the previously identified data to be anonymized; and to generate, from the anonymized data and the response message RRM2, an anonymized response message RRM2'.

The communication means 12 is capable of exchanging data with third party communicating electronic devices. The communication means 12 may correspond to any element or combination of elements enabling a user to send requests, via a communication network (e.g. LAN, WLAN, or PAN, database log, e-mail), to third party devices. Advantageously, it is configured to receive a performance test request message RM1, RM2 and/or a response message RRM1, RRM2 and to transmit a restored performance test request message RM2' or a non-restored performance test request message RM1 and/or an anonymized request response message RRM2' or a non-anonymized request response message RRM1.

The data memory 13 is advantageously configured to store a sensitive data identification repository 14 and an anonymization repository 15. It can also be configured to store a correspondence repository 16 between sensitive data and anonymized data. The data memory 13 may comprise a transient memory and/or a non-transient memory. The non-transient memory may be a medium such as a CD-ROM, memory card, local hard disk or a hard disk hosted by a remote server. Preferably, the data memory 13 takes the form of a local hard disk. The data memory 13 is particularly suitable for storing, for example in the form of one or more files, data generated by an MMI (for Man-Machine Interface) or by consumption probes or data acquired via another module. The stored data may have been entered by a user via an MMI at start-up or over time.

An anonymization module 10 according to the invention may be carried by a dedicated communicating electronic device or may be integrated into one of the components of the n-tier application. Thus, the anonymization module 10 can be integrated into a persistence server 20, a business server 30 or a presentation server 40.

Thus, according to another aspect, the invention relates to a system 2 for analyzing the performance of an n-tier application. An example of a system 2 for analyzing the performance of an n-tier application according to the invention is shown in FIG. 1. In addition to an anonymization module 10 for analyzing the performance of an n-tier application according to the invention, such a system may comprise a persistence server 20 configured to receive a performance test request message RM1, RM2' and/or to transmit a response to a request message RRM1, RRM2'.

In particular, the second communicating device may correspond to a computing infrastructure comprising one or more servers.

Advantageously, such a system may comprise a presentation server 40 configured to receive and transmit a response message to a performance test request, either anonymized RRM2' or not RRM1.

When reference is made to system 2 according to the invention, said system is comparable to a system comprising an n-tier architecture with:
 a presentation layer of the application, responsible for displaying the data and interacting with the corresponding n-tier application through a suitable man-machine interface executed by a presentation server 40,
 a business layer of the application, responsible for all the processes that will make it possible to handle and transform business data defined by a client request (through request messages issued by a client workstation PC) and executed by a business server 30,
 an anonymization module 10, and
 a database represented by a persistence server 20.

Advantageously, such a system may comprise a client workstation PC from which an operator can control a performance test and through which request messages are sent to a persistence server 20.

It is for example within such a system that a method according to the invention can be executed. Indeed, according to another aspect, the invention relates to a method for analyzing the performance of an n-tier application comprising on-the-fly anonymization processing 400 of production data. Such a method can be implemented by an anonymization module 10 as described above.

Figure 2:
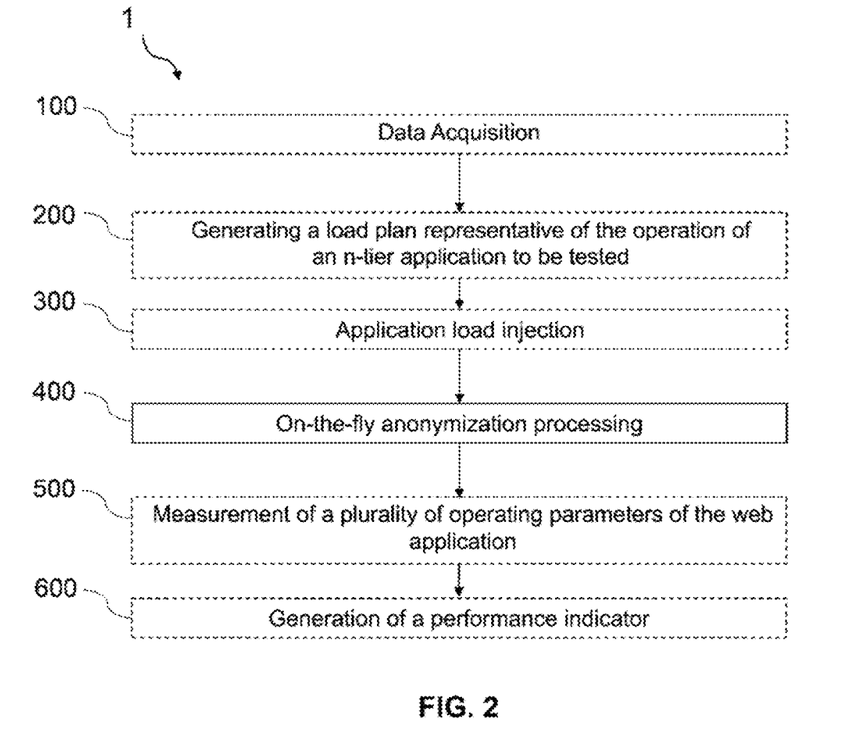
FIG. 2 shows a diagram of the different steps of a method for analyzing the performance of an n-tier application according to the invention. The steps in dashed boxes are optional.

As shown in FIG. 2, and as will be detailed below, a method according to the invention comprises a step of on-the-fly anonymization processing 400 of production data of an n-tier application.

In addition, it may comprise steps of data acquisition 100, generation 200 of a load plan, injection 300 of an application load, measurement 500 of a plurality of operating parameters of the n-tier application, and generation 600 of at least one performance indicator value of the n-tier application.

Such a method advantageously comprises a data acquisition step 100. This acquisition step 100 can, for example, be performed by a processing unit of a client workstation PC.

This acquisition step 100 corresponds, for example, to the loading of parameters and operating rules making it possible to implement the method. This step can be carried out just before the following steps in the method. This data acquisition step 100 comprises more specifically the loading of data, preferably stored in a data memory of an electronic device communicating with a PC 10 carrying out the performance test of the n-tier application. The acquired data may include data identifying the resources used and their maximum level of use by the computing device implementing the n-tier application tested, data corresponding to predetermined thresholds of quality of service parameters, beyond which the tested n-tier application is considered to have failed, resource consumption rules and a predetermined load plan representative of the operation of the n-tier application tested.

Once the data acquisition step 100 has been carried out, a method according to the invention may comprise a step of generating 200 a load plan. This step of generating 200 a load plan can, for example, be implemented by a processing unit of a client workstation PC.

As described above, a load plan can be previously stored in a data memory of the client station, or, more generally, of the communicating electronic device carrying out the performance test of the n-tier application. Thus, a plurality of load plans can be recorded in such a data memory, each load plan being able to be associated with a particular scenario of a performance test, such as a non-regression test, a test for finding limits associated in particular with a maximum user load or a processing speed, an endurance test consisting of determining the persistence of the performance limits over time before performance downturns occur, a "crash" test aimed at analyzing the behavior of one or more servers on which the n-tier application is implemented. Thus, a load plan can be representative of conventional operation, or the nominal load, of the n-tier application to be tested, or can be used to generate constraints on the computing device simulating the activity and therefore the use of resources by the n-tier application to be tested, such as according to the performance test scenarios described shortly above. The nominal load corresponds to the current activity on the application or the load generally observed in production for the n-tier application. This can correspond, for example, to a distribution of different types of scenarios reproducing the main actions involved in the implementation of the n-tier application, with, for example, how many scenarios of each type must be simulated per hour to mimic the operation of the use of the n-tier application.

Thus, a load plan can advantageously comprise values for the following parameters: the different types of scenario, the weighting of each of these business scenarios (e.g. the relative proportion of one to the others), and the overall load level (e.g. the target volume or the desired request throughput during the method). Similarly, it may comprise information on the number of scenarios of each type executed simultaneously, for example for one hour. It may also comprise information on the computing device tested.

A load plan may thus be characterized by a set of requests, generally recorded in a load control file containing the code to be executed. Executing the load control file may result in a certain number of actions as varied as creating, viewing, modifying, deleting files or printing, copying and displaying data. These actions will generally be similar to the core business activities supported when using the n-tier application. Therefore, as will be described in detail below, a method according to the invention may also comprise a step of injecting an application load.

Advantageously, a load plan may comprise an application load repository configured to store in memory fields relating to the start date of the load; this is for example an absolute date evaluated relative to an internal clock of the computing device carrying out the test of the n-tier application or a date relative to the start of a test scenario. It can also comprise the end date of the load or the duration of the load, for example a number of seconds.

Following the generation of a load plan, a method 1 for analyzing the performance of an n-tier application may comprise a step of injecting 300 the application load relative to a previously determined performance test scenario. Said step of injecting 300 the application load can be implemented by an injection module carried by a communicating electronic device PC, 10.

The load data, contained in the load plan, can be used by the injection module to create a load plan that makes it possible to simulate the activity of an n-tier application with, for example, opening and sending files, creating backups or surfing on the Internet.

The computing device is preferably subjected to the application load using injection mechanisms such as JMeter®, Tsung® or Gaffing®. Preferably, this is achieved by injecting requests according to a predetermined load plan.

During the injection step, an electronic device such as the client workstation PC will send requests to an n-tier application and these requests will advantageously be intercepted by the anonymization module 10. In order to allow the continuous use of the production data of the n-tier application to be tested, a method 1 for analyzing the performance of an n-tier application in accordance with the invention comprises on-the-fly anonymization processing 400. The on-the-fly anonymization processing 400 may be carried out by a processing unit 11. This processing unit 11 may be integrated into the persistence server 20 or may be remote in an anonymization module 10, which may, in particular, comprise a database access module 17 such as, by way of non-limiting example, a database driver. The anonymization processing 400 generally follows the step of injecting 300 the application load.

In order to ensure compliance with confidentiality policies relating to a particular business aspect, all or part of the production data used to carry out a performance test must be anonymized. Such a business aspect may, for example, correspond to a set of pre-established rules from which sensitive data will be determined.

Thus, the anonymization processing may comprise a transformation of sensitive data from production, according to any suitable data transformation technique. Advantageously, such a transformation may correspond to any data encryption technique aimed at rendering the data incomprehensible when read by a third party device, in particular a client workstation PC. Preferably, such a transformation of sensitive data from production data may correspond to any encoding technique so as to maintain consistency between data deemed sensitive, e.g., data to be anonymized, and the corresponding transformed data, e.g., the anonymized data, and to enable the data to be understood when it is read by a third party device, in particular a PC client workstation. Indeed, for performance tests, it may be essential that at least part of the encoded data be accessible, the encoding of sensitive data then makes it possible to replace the sensitive data by anonymized data of the same nature. By way of example, but without limitation, a sensitive data element, e.g., relating to a male forename, may be encoded in such a way that it is replaced by an encoded (e.g., anonymized) data element relating to another male forename, therefore, not allowing the person to be identified.

As described above, the step of injecting 300 an application load can correspond to sending one or more request messages. Such request messages may consist of a request issued under an HTTP ("Hypertext Transfer Protocol") communication protocol encoding a GET type command, for example. Therefore, an on-the-fly anonymization processing 400 may preferably comprise the modification of a request, for example of SQL type, issued under an HTTP communication protocol, before transmitting same to the n-tier application subject to the performance test.

Figure 3:
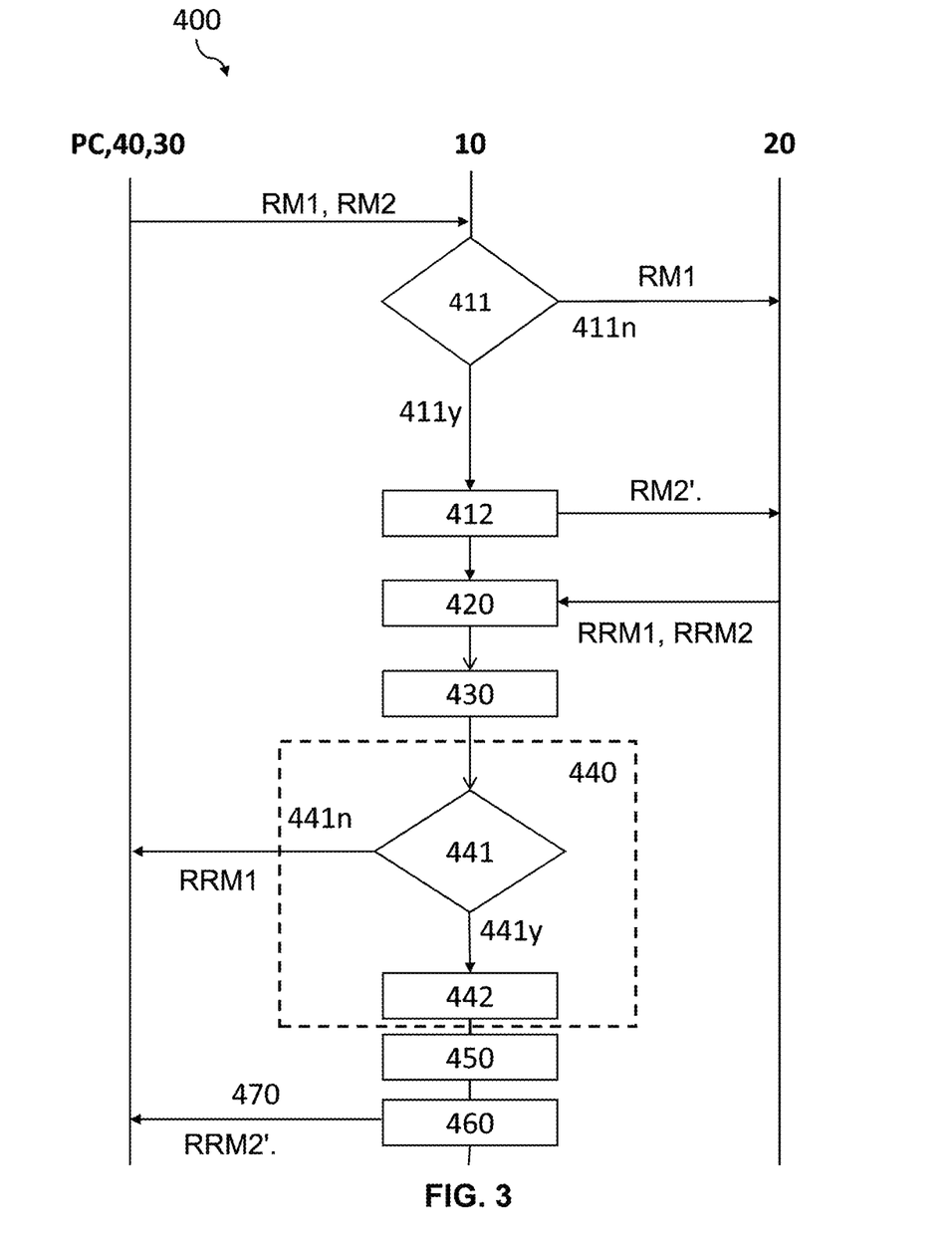
FIG. 3 shows a diagram of an anonymization processing of a method for analyzing the performance of an n-tier application according to the invention.

One embodiment of an anonymization processing will now be detailed in connection with FIG. 3.

An anonymization processing 400 according to the invention may comprise a step of comparing 411 the data of a request message RM1 to a correspondence repository 16 between sensitive data and anonymized data following the reception of said request message previously sent by a client workstation PC. This advantageously makes it possible to identify one or more anonymized data elements.

Thus, if comparison step 411 does not enable the identification of anonymized data, the request message RM1 is directly transmitted 411*n* by the communication means 12 of the anonymization module 10 to the persistence server. When initiating the sending of a request message RM1, the latter can encode a request for access to a homepage of the n-tier application to be tested. We will assume that when initiating the sending of an MR1 request message, it does not contain any anonymized data.

However, during a performance test, multiple request messages are generally exchanged. Access to this production data is often necessary for the implementation of a method for analyzing the performance of an n-tier application.

Let us assume that the persistence server 20 comprises data associated with the medical field, such as, by way of non-limiting example, reimbursement data for drug products prescribed by an attending physician for a given individual, the last name, first name, date of birth, gender, or social security number associated with said individual.

Thus, an MR2 request message may contain one or more anonymized data elements, where a match between each anonymized data element and the matching repository 16 can be identified 411*y* in the comparison step 411.

The identification of anonymized data is followed by a step of restoration 412 of an anonymized data element, by comparing each previously identified anonymized data element with the matching repository 16 in order to identify the corresponding data that had previously been anonymized. To illustrate such an identification, let us assume that a first request message encoding a command to access individuals' medical data has been previously issued and that this data, once anonymized, has been communicated to the client workstation PC. The request message RM2 could for example correspond to a request message encoding data ordering access to reimbursements and drug products associated with a given individual, an example of which is shown below.

<RM2
<Reimbursement: ?
<Drug product: ?
<Social Security Number: 1 89 08 01 007 117 15

In this case, the social security number identified in step 411 corresponds to an anonymized data element. During the restoration step 412, the sensitive data that had been previously identified and recorded in the correspondence repository between a sensitive data element and an anonymized data element will thus make it possible to generate a restored MR2' request message comprising the corresponding restored data element. An example of a restored MR2' request message including such restored data element, in this case the social security number, is shown below.

<RM2'
<Reimbursement: ?
<Drug product: ?
<Sec_Num: 1 90 06 06 069 143 18

The restored request message RM2' is then transmitted to the persistence server 20.

Whether a request message comprises an anonymized data element RM2 or a non-anonymized data element RM1, the transmission of a restored request message RM1 or RM2', the persistence server 20 is able to read the data from said request messages and to transmit a response message RRM1, RRM2 to the anonymization module 10.

Let us now assume that one of the response messages RRM1 does not comprise sensitive data while another response message RRM2 comprises data relating to the set of drug product prescriptions for the individual in question. Said persistence server 20 then transmits the response message RRM2 comprising the corresponding data to the anonymization module 10, an example of which is shown below.

<RRM2
<Last name: Dupont
<First name: Jean
<Age: 29
<Sex: M
<Reimbursement: __________
<Drug product: __________
<Social Security Number: 1 90 06 06 069 143 18

The response message RRM2 shown above thus presents an example of data encoded by a response message RRM2, the data of a single individual is represented, although said response message RRM2 may comprise a plurality of data elements associated with several individuals or several drug products. The anonymization module 10 thus receives 420 said response message RRM2 and an identification step 430 implemented by the processing unit 11 of the anonymization module 10 will make it possible to highlight data to be anonymized by comparing the data from the response message RRM2 with the sensitive data identification repository 14 of said anonymization module 10. Advantageously, such a sensitive data identification repository can be configured to comply with business rules. In the example shown here, a business rule may consist of associating a data element that has been identified as sensitive or non-sensitive. In the response message shown, all data, except data elements associated with gender and requirements, are considered sensitive. Like the request messages RM1 and RM2, the response messages RRM1 and RRM2 correspond respectively to a response message comprising no sensitive data and a response message comprising at least one sensitive data element.

During said identification step 430, the identified sensitive data relating to the fields associated with the Last Name, First name, age and social security number will then be anonymized during an encoding step 440 implemented by the processing unit 11 of the anonymization module 10. Such a step 440 may comprise a comparison 441 of said identified sensitive data with the anonymization repository 15.

If the comparison 441 does not make it possible to identify a sensitive data element, then the data present in the RRM1 response message are directly transmitted 441*n*, in a response message to an RRM1 request without being anonymized, via the communication means 12 to the PC client station.

Advantageously, the anonymization of the identified sensitive data can correspond to an encoding of said sensitive data according to known data transformation techniques. According to a preferred embodiment, the identified sensitive data can be anonymized according to previously configured business rules.

On the other hand, if the comparison 441 makes it possible to identify 441*y* sensitive data, said identified sensitive data is thus anonymized during a transformation step 442. The anonymization of each of the previously identified sensitive data fields can be subject to a specific encoding. The anonymization repository can generate new replacement data for each field associated with a sensitive data element in accordance with a business rule. By way of example, depending on the gender of the individual, the data element associated with the first name will be replaced by a data element associated with a male first name. Changing the data element associated with the individual's age will also result in the modification of the social security number, on the one hand, to maintain data confidentiality, and on the other hand to maintain consistency within the data for performance testing purposes. Similarly, changing the gender of the individual, if it were considered a sensitive data element, would also result in a change in the social security number.

An example of data anonymization of a response message RRM2' having anonymized data is shown below.

<RRM2'.
<Last name: Pierre
<First name: Martin
<Age: 30
<Sex: M
<Reimbursement: _________
<Drug product: _________
<Sec_Num: 1 89 08 01 007 117 15

Once the data has been anonymized, a performance analysis method 1 according to the invention may comprise a step of recording 450 on a correspondence repository 16 between the anonymized data, i.e. the data present in the response message RRM2', and the identified sensitive data, i.e. the data present in the response message RRM2. The anonymized data recorded in this way can be easily decoded at a later stage. Said recording step is followed by a step of generating 460, by the processing unit 11 of the anonymization module 10, an anonymized response message RRM2', then by a step of sending 470, by the communication means 12 of the anonymization module 10, said anonymized response message to the client workstation PC.

Whether it is a response message RRM1 to a request or an anonymized response message RRM2', both said messages comprise data necessary for analyzing the performance of the n-tier application, in particular relating to the measurements taken by the probe(s).

In addition, a performance analysis method 1 in accordance with the invention may comprise a step of measuring 500 a plurality of operating parameters of the n-tier application. The step of measuring 500 a plurality of operating parameters may be implemented by probes and/or a metrics collection module. In parallel with the reception of responses to request messages, the method may comprise the measurement of a plurality of operating parameters of the n-tier application.

The operating parameters of the n-tier application may correspond to operating parameters relating to the electronic devices hosting the n-tier application (such as the persistence server 20, the business server 30 and the presentation server 40) or to parameters relating to the operation of the n-tier application. Therefore, a metrics collection module is able to, preferably configured to, measure the resource consumption of the persistence server 20, business server 30 and/or presentation server 40; and/or the service levels of the n-tier application tested. Preferably, the metrics collection module is configured to generate measured values of service levels of the n-tier application tested.

In order to do this, the metrics collection module can use one probe or a plurality of probes. The probe(s) make it possible to collect data on the resource consumption of the computing infrastructure supporting the n-tier application and, more specifically, of each server making up the n-tier application. Several resources can be measured in parallel. The probe(s) can also be used to measure the service levels of the n-tier application. The collection module can use a monitoring file comprising metrics collection rules. These metrics collection rules can specify data that must be recorded when the n-tier application is executed.

For example, these measurements can be carried out using a probe such as Nigel's Monitor (Nmon) or Performance Monitor (Perfmon). Nmon probes make it possible for example to display CPU, memory, swap, and network data, information about users, groups, storage media, kernel usage, or the most heavily-consuming processes. Perfmon probes make it possible to measure the performance of a computing device. For example, the information collected can correspond to percentages of resource usage, response times, processing times, but also port status, file system occupancy rate, the operating rate of the garbage collector for J2EE applications (Java Enterprise Edition).

These probes can be associated with each parameter (e.g. resource or functionality) to report measurement or metrics information, representing, for example, the operating state of the resources and the associated consumption. For each parameter, the probe(s) define a parameter identifier and a parameter value. Parameter values can be monitored continuously or at configurable intervals so as to obtain information for each parameter as a function of time. This information can be stored in a data memory.

The metrics collection module makes it possible to collect and measure resource consumption and/or service levels of the n-tier application or the computing infrastructure hosting the n-tier application.

In addition, a performance analysis method 1 in accordance with the invention may comprise a step of generating 600 at least one performance indicator value of the n-tier application. This step of generating 600 at least one performance indicator value may be implemented by a processing unit of a business server 30. Advantageously, it follows the step of measuring 500 a plurality of operating parameters of the n-tier application. In addition, it is generally based on the values of measured operating parameters.

In particular, such an indicator can be generated based on consumption parameters and/or service levels previously measured during step 500. The generation of said indicator is then returned to an operator via a suitable man-machine interface in the communicating electronic device used to test the n-tier application. The performance indicator can thus be in the form of a value reflecting the measurements previously taken; such a value can then mean that the data corresponding to predetermined thresholds of quality of service parameters, beyond which the n-tier application tested is considered to have failed, have been exceeded or, on the contrary, have not been reached. This may advantageously give an operator an idea of how the n-tier application is operating.

Preferably, a performance indicator according to the invention may be in the form of a table of values, or one or more graphs, presenting the data measured by one or more probes as a function of time and indicating any exceeding of a predetermined threshold of consumption and/or quality of service parameters in comparison with the measured data.

In the context of the comparison with resource consumption measurement data, the predetermined maximum values may, for example, correspond to predetermined maximum usage thresholds. In the context of the comparison with service level measurement data, the predetermined maximum values may, for example, correspond to thresholds set during the implementation of the applications. Predetermined maximum values can also be freely set by the information systems management within the context of its performance management policy for its installations. It should be understood that it may be equivalent to use predetermined minimum values instead of predetermined maximum values. This is particularly the case for the assessment of service levels.

The detection of a failure via the measured values of service levels makes it possible to monitor the performance of the n-tier application and may, for example, refer to the performance observed by the end-users of the n-tier application such as, for example, an average response time.

Thus, a method according to the invention may comprise a failure detection step comprising a comparison of predetermined thresholds of quality of service parameters to the measured values of resource consumption and/or service levels of the n-tier application. In addition, it may comprise an identification of exceeding predetermined maximum values by the measured values.

A method according to the invention may also comprise a failure analysis step, said failure analysis step comprising, in the presence of a predetermined quality of service parameter threshold being exceeded, an analysis of a behavior of the n-tier application and a generation of failure data capable of providing information on the nature and/or source of the failure.

Thus, once a failure has been caused, the method may comprise a determination, in particular with the aid of an application performance management module, of the nature of the failure. The failure can be of many different types. For example, it can be linked to system configuration problems (number of open files, number of ports, etc.) as well as application configuration problems (jms file, jdbc pool, etc.) or even n-tier application design problems such as coupling between processes that is too strong.

Thus, the application performance management module is preferably configured to select the nature of the failure from the following failures:
hardware configuration of the computing device,
software configuration of the computing device,
configuration of the n-tier application, and
design of the n-tier application.

Thus, the solutions proposed in the present invention enable on-the-fly anonymization of production data of an n-tier application as said data is transmitted by one or more databases. This selective anonymization of a dataset therefore allows providing a complete dataset for performance testing on n-tier applications in complete security/confidentiality. In addition, beyond the performance analysis, the invention will be able to help an administrator to correct possible identified failures.

What is claimed is:

1. A method for analyzing a performance of an n-tier application implemented by a system comprising an anonymization module and a persistence server, wherein said method comprises:
   providing an anonymization module;
   providing a persistence server distinct from said anonymization module;
   storing, by said persistence server, data for execution of the n-tier application;
   receiving, by said persistence server, a performance test request message;
   reading, by said persistence server, data from said performance test request message;
   transmitting, by said persistence server, a response message to said anonymization module;
   on-the-fly anonymization processing of production data, said production data being generated following said performance test request message being transmitted to the persistence server,
   wherein said on-the-fly anonymization processing is implemented by the anonymization module comprising a processing unit, a communication medium, and a data memory configured to store in memory a sensitive data identification repository and an anonymization repository,
   wherein said on-the-fly anonymization processing of said production data of the n-tier application comprises
      receiving, by the communication medium, said response message, following said transmitting of said response message by the persistence server;
      identifying, by the processing unit from the sensitive data identification repository, data to be anonymized in the response message;
      encoding, by the processing unit from the anonymization repository, wherein said encoding comprises generation of anonymized data from the data to be anonymized that is previously identified, and wherein the generation of said anonymized data is performed according to business rules,
         wherein the business rules assist in identifying associations between the data to be anonymized in order to maintain confidentiality of the data to be anonymized and to maintain consistency within the anonymized data;
      generating, by the processing unit from the anonymized data and the response message, an anonymized response message;
      sending, by the communication medium, the anonymized response message to a business server, wherein said anonymized response message comprises data necessary for analyzing the performance of the n-tier application;
      recording, on a correspondence repository, a correspondence between each of the data to be anonymized and each corresponding anonymized data;
      comparing the data of a second performance test request message with the correspondence repository;
      based on said comparing, determining that said second performance test request message does not comprise any anonymized data elements; and based on said determining, transmitting, by the communication medium, the second performance test request message to the persistence server.

2. The method for analyzing the performance of an n-tier application according to claim 1, further comprising measuring a plurality of operating parameters of the n-tier application, optionally at least partly from a plurality of anonymized response messages.

3. The method for analyzing the performance of an n-tier application according to claim 2, further comprising generating at least one performance indicator value of the n-tier application.

4. The method for analyzing the performance of an n-tier application according to claim 1, further comprising generating at least one load plan comprising at least one scenario of a performance test capable of allowing a plurality of request messages to be generated.

5. The method for analyzing the performance of an n-tier application according to claim 4, wherein the at least one load plan is previously recorded on a second data memory of a communicating electronic device carrying out the performance test of the n-tier application.

6. The method for analyzing the performance of an n-tier application according to claim 5, further comprising injecting an application load relating to the at least one scenario of the performance test, wherein said injecting the application load is implemented by an injection module of the communicating electronic device carrying out the performance test.

7. The method for analyzing the performance of an n-tier application according to claim 6, wherein the application load makes it possible to simulate an activity of the n-tier application through requests to the n-tier application, and wherein the requests are intercepted by the anonymization module.

8. The method for analyzing the performance of an n-tier application according to claim 1, further comprising identifying an anonymized data element in the performance test request message then restoring the anonymized data element, wherein said restoring comprises, from the correspondence repository, a substitution in the performance test request message of the anonymized data element by a corresponding data element to be anonymized to generate a restored request message.

9. The method for analyzing the performance of an n-tier application according to claim 1, wherein the encoding corresponds to one or more of an anonymization and a pseudonymization of all or part of the data to be anonymized.

10. An anonymization module configured to perform on-the-fly anonymization processing of production data generated by an n-tier application, said production data being generated following a performance test request message transmitted to said n-tier application, wherein said anonymization module comprises:
a communication medium configured to receive a response message to the performance test request message, following transmission of said response message by a persistence server, wherein said persistence server is distinct from said anonymization module, and wherein said persistence server is configured to
store data for execution of the n-tier application,
receive said performance test request message,
read data from said performance test request message, and
transmit said response message to said anonymization module;

a data memory configured to store a sensitive data identification repository and an anonymization repository;
a processing unit configured to
analyze one or more of said performance test request message and the response message, and
implement said on-the-fly anonymization processing of the production data,
wherein said processing unit is configured to
identify, from the sensitive data identification repository, data to be anonymized in the response message;
generate, from the anonymization repository, anonymized data from the data to be anonymized that is previously identified, and wherein the generate said anonymized data is performed according to business rules,
wherein the business rules assist in identifying associations between the data to be anonymized in order to maintain confidentiality of the data to be anonymized and to maintain consistency within the anonymized data; and
generate an anonymized response message from the anonymized data and the response message;
wherein said communication medium is further configured to send the anonymized response message to a business server, said anonymized response message comprising data necessary for analyzing a performance of the n-tier application;
recording, on a correspondence repository, a correspondence between each of the data to be anonymized and each corresponding anonymized data;
comparing the data of a second performance test request message with the correspondence repository;
based on said comparing, determining that said second performance test request message does not comprise any anonymized data elements; and
based on said determining, transmitting, by the communication medium, the second performance test request message to the persistence server.

11. A system for analyzing performance of an n-tier application, said system comprising:
a persistence server configured to
store in memory data for execution of the n-tier application,
receive a performance test request message,
read data from said performance test request message, and
transmit a request response message to an anonymization module;
wherein said anonymization module is distinct from said persistence server and that is configured to perform on-the-fly anonymization processing of production data generated by the n-tier application, said production data being generated following the performance test request message being transmitted to said n-tier application, wherein said anonymization module comprises
a communication medium configured to receive the request response message to the performance test request message, following said transmit said request response message by the persistence server,
a data memory configured to store a sensitive data identification repository and an anonymization repository,
a processing unit configured to
analyze one or more of said performance test request message and the request response message, and
implement said on-the-fly anonymization processing of the production data, wherein said processing unit is configured to
identify, from the sensitive data identification repository, data to be anonymized in the request response message; generate, from the anonymization repository, anonymized data from the data to be anonymized that is previously identified, and wherein the generate said anonymized data is performed according to business rules,
wherein the business rules assist in identifying associations between the data to be anonymized in order to maintain confidentiality of the data to be anonymized and to maintain consistency within the anonymized data; and
generate an anonymized response message from the anonymized data and the request response message;
wherein said communication medium is further configured to send the anonymized response message to a business server, said anonymized response message comprising data necessary for analyzing the performance of the n-tier application;
recording, on a correspondence repository, a correspondence between each of the data to be anonymized and each corresponding anonymized data;
comparing the data of a second performance test request message with the correspondence repository;
based on said comparing, determining that said second performance test request message does not comprise any anonymized data elements; and
based on said determining, transmitting, by the communication medium, the second performance test request message to the persistence server.

12. The system for analyzing the performance of an n-tier application according to claim 11, further comprising a communicating electronic device carrying out a performance test configured to transmit the performance test request message and receive the request response message, optionally anonymized.

\* \* \* \* \*